United States Patent
Seal et al.

(10) Patent No.: US 12,243,007 B2
(45) Date of Patent: Mar. 4, 2025

(54) EQUIPMENT TRACKING FOR AN INFORMATION HANDLING SYSTEM

(71) Applicant: Dell Products L.P., Round Rock, TX (US)

(72) Inventors: Abhirup Seal, Bangalore (IN); Chinmay Shripad Hegde, Uttara Kannada District (IN); Hari Venkatachalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 17/813,893

(22) Filed: Jul. 20, 2022

(65) Prior Publication Data

US 2024/0029015 A1    Jan. 25, 2024

(51) Int. Cl.
*G06Q 10/087* (2023.01)

(52) U.S. Cl.
CPC .................. *G06Q 10/087* (2013.01)

(58) Field of Classification Search
CPC ............. G06Q 10/087; G06Q 30/0635; G06Q 10/103; G06Q 30/0185; G06Q 10/105; G06Q 10/063; G06Q 50/205; G06Q 50/163; G06Q 30/0609; G06Q 10/10; G06Q 10/06315; G06Q 10/083; G06Q 10/0631; G06Q 30/0611; G06Q 50/01; G06Q 20/382; G06Q 10/00; G06F 8/65; G06F 16/9554; G06F 17/30879; G07C 5/0808; G07C 5/008; G07C 1/10; G07C 9/00571; G07F 17/0042; G06K 17/0022; H04L 67/125;

(Continued)

(56) References Cited

U.S. PATENT DOCUMENTS

| | | | | |
|---|---|---|---|---|
| 2017/0083854 A1* | 3/2017 | Elyea | ................ | G06F 16/9554 |
| 2018/0374037 A1* | 12/2018 | Nazzari | ................ | G09C 5/00 |
| 2022/0358240 A1* | 11/2022 | Neal | ................ | G06F 21/6245 |

FOREIGN PATENT DOCUMENTS

| | | | | |
|---|---|---|---|---|
| CN | 107614802 A | * | 1/2018 | ............... E02F 3/96 |
| CN | 111401746 A | * | 7/2020 | |

(Continued)

OTHER PUBLICATIONS https://www.ibm.com/docs/en/power8/8335-GCA?topic=ipmi-overview (Year: 2019).*

*Primary Examiner* — Russell S Glass
(74) *Attorney, Agent, or Firm* — Norton Rose Fulbright US LLP

(57) ABSTRACT

In some aspects, baseboard management controllers (BMCs) may register with an inventory management server (IMS). After registering with the IMS, based on detecting a change in inventory monitored by a BMC, the BMC may transmit a push notification to the IMS to notify the IMS of the change. The IMS may record such information in a database, which may be accessible to a system administrator, to one or more other users or systems, or a combination thereof. For example, the system administrator or other user or system may access the IMS to obtain a listing of registered BMCs and equipment associated with the registered BMCs, to search parts based on one or more filters (such as part serial number, part number, or part location, etc.), or to get lifecycle information related to one or more parts.

20 Claims, 4 Drawing Sheets

(58) Field of Classification Search
CPC ....... H04L 67/025; H04L 67/53; H04L 67/10; H04L 67/20; H04W 4/14; G01V 99/00
USPC .......................................................... 705/28
See application file for complete search history.

(56) References Cited

FOREIGN PATENT DOCUMENTS

| | | | | | |
|---|---|---|---|---|---|
| TW | | 1783478 B | * | 5/2021 | ............... G06F 9/48 |
| WO | WO-2020050869 A1 | | * | 3/2020 | ......... G06Q 10/0833 |

* cited by examiner

EQUIPMENT TRACKING FOR AN INFORMATION HANDLING SYSTEM

FIELD OF THE DISCLOSURE

This disclosure relates to information handling systems. More specifically, portions of this disclosure relate to equipment tracking for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some circumstances, management of such devices may incur overhead, such as time and resources spent monitoring the devices and recording information related to the devices. For example, a system administrator of a datacenter may record a list of devices and configurations of the devices. The system administrator may periodically conduct an audit of devices in the datacenter to update the list of devices and configurations.

Some systems use a baseboard management controller (BMC) to monitor devices and device configurations and to record such information. The BMC may monitor devices and to collect the information. A system administrator (or other party) may query the BMC to obtain the information. For a large datacenter or other system, device monitoring may introduce a large load on a BMC. To reduce the load on a BMC, some datacenters and other systems may reduce the frequency of data collection or other operations performed by a BMC. Such a technique may increase instances of outdated (or "stale") data.

SUMMARY

In some aspects of the disclosure, baseboard management controllers (BMCs) may register with an inventory management server (IMS). Registration may include assignment of a respective registration identifier (ID) to each of the BMCs. After registering with the IMS, based on detecting a change in equipment (also referred to herein as inventory) monitored by a BMC, the BMC may transmit a push notification to the IMS to notify the IMS of the change. The push notification may include the registration ID of the BMC.

The IMS may record such information in a database, which may be accessible to a system administrator, to one or more other users or systems, or a combination thereof. For example, the system administrator or other user or system may access the IMS to obtain a listing of registered BMCs and equipment associated with the registered BMCs, to search parts based on one or more filters (such as part serial number, part number, or part location, etc.), or to get lifecycle information related to one or more parts.

In some implementations, a representational state transfer (REST) application program interface (API) may enable one or more operations described herein. For example, the IMS may expose a first REST API to a BMC to enable one or more of registration of the BMC with the IMS, deregistration of the BMC, addition of inventory to the database of the IMS, updating of the inventory at the database, or deletion of inventory from the database. Alternatively or in addition, the IMS may expose a second REST API (e.g., a client-facing REST API) to a client (e.g., a system administrator or other user or system) to enable the client to obtain information from the database of the IMS.

By using push notifications to the IMS (e.g., instead of queries to BMCs by a system administrator), an amount of messaging in a system may be reduced as compared to other techniques. For example, an amount of messaging may be reduced as compared to a system in which a system administrator transmits a query to a BMC to obtain information on system devices. As a result, a load on BMCs may be reduced as compared to other systems, and network congestion may be reduced. Further, use of push notifications may reduce transmission of redundant or unhelpful information, which may occur in some conventional systems when a BMC has no new updated information to report in response to a query.

Further, some aspects described herein may reduce an amount of stored credentials and other information stored by a system administrator, which may increase efficiency and network security. To illustrate, in some conventional systems, each system administrator may maintain BMC information, such as an Internet Protocol (IP) address or other credentials, which system administrators may use to query a BMC. Such credentials may occasionally change over time (such as due to a change in IP address), which may introduce delays or difficulty in querying the BMC. In some aspects of the disclosure, an IMS may centrally store such BMC information and may receive push notifications from BMCs in response to changes (such as BMC credential changes), which may reduce or avoid querying based on incorrect or outdated information (e.g., due to a change in IP address of a BMC). Further, reducing or avoiding storage of such information by system administrators may increase network security in some cases (e.g., by reducing or avoiding storage of credentials externally to a datacenter).

In some aspects, an apparatus includes a memory and one or more processors coupled to the memory. The one or more processors are configured to receive a registration request associated with a management controller that is assigned to monitor a set of equipment. The one or more processors are further configured to transmit a registration response to the management controller based on the registration request and to receive, from the management controller, a push notification indicating a change to the set of equipment and further indicating an identification information that is based on the registration request. The one or more processors are further configured to initiate an update to an equipment tracking database based on the indication of the change.

In some implementations, the change to the set of equipment includes one or more of addition of first equipment to set of equipment, removal of second equipment from the set of equipment, or modification of third equipment of the set of equipment.

In some implementations, the one or more processors are further configured to add a first indication of the first equipment to the equipment tracking database, remove a second indication of the second equipment from the equipment tracking database, modify one or more attributes associated with a third indication of the third equipment at the equipment tracking database, or a combination thereof.

In some implementations, the registration request further indicates one or more of a service tag associated with the management controller, a location of the management controller, or a registration request opcode.

In some implementations, the one or more processors are further configured to, based on the registration request, determine a registration identifier (ID) associated with the management controller, where the identification information includes or is based on the registration ID, and to store the registration ID to a registration database, where the registration ID is unique to the management controller within the registration database.

In some implementations, the one or more processors are further configured to expose a representational state transfer (REST) application program interface (API) to the management controller to enable the management controller to provide one or more of the registration request or the push notification.

In some implementations, the one or more processors are further configured to, based on the registration response and prior to receiving the push notification, receive, from the management controller, an inventory snapshot of the set of equipment and to store the inventory snapshot to the equipment tracking database.

In some implementations, the push notification indicates one or more of a service tag associated with an item of the set of equipment, a part number of the item, a serial number of the item, a description of the item, or a name of the item.

In some implementations, the one or more processors are further configured to receive an inventory request from a client device, to access, based on the inventory request, the equipment tracking database to identify inventory data, and to transmit, to the client device, a response indicating the inventory data.

In some implementations, the inventory request indicates one or more filtering parameters, and the one or more processors are further configured to access the equipment tracking database to identify the inventory data based on the one or more filtering parameters.

In some implementations, the one or more processors are further configured to expose a client-facing representational state transfer (REST) application program interface (API) to the client device to enable communication of the inventory request.

In some implementations, the inventory data indicates one or more of a movement history of an item within a datacenter, a usage history of the item, a current status associated with the item, a lifecycle of the item, a listing of management controllers that are associated with the equipment tracking database, or a listing of equipment associated with the management controllers.

In some other aspects of the disclosure, a method includes receiving a registration request associated with a management controller that is assigned to monitor a set of equipment. The method further includes transmitting a registration response to the management controller based on the registration request and receiving, from the management controller, a push notification indicating a change to the set of equipment and further indicating identification information that is based on the registration request. The method further includes initiating an update to an equipment tracking database based on the indication of the change.

In some implementations, the change to the set of equipment includes one or more of addition of first equipment to set of equipment, removal of second equipment from the set of equipment, or modification of third equipment of the set of equipment.

In some implementations, the method further includes performing one or more of adding a first indication of the first equipment to the equipment tracking database, removing a second indication of the second equipment from the equipment tracking database, or modifying one or more attributes associated with a third indication of the third equipment at the equipment tracking database.

In some implementations, the registration request further indicates one or more of a service tag associated with the management controller, a location of the management controller, or a registration request opcode.

In some other aspects of the disclosure, an information handling system includes a memory and one or more processors coupled to the memory. The one or more processors are configured to initiate transmission, to an inventory management server (IMS), of a registration request associated with a management controller that is assigned to monitor a set of equipment. The one or more processors are further configured to receive a registration response from the IMS based on the registration request and to transmit, to the IMS, a push notification indicating a change to the set of equipment and further indicating identification information that is based on the registration request.

In some implementations, the one or more processors are further configured to receive, based on an update to an equipment tracking database that is based on the push notification, a response to the push notification from the IMS.

In some implementations, the update to the equipment tracking database is associated with a logical address within the equipment tracking database of a part of the set of equipment, and wherein the response indicates the logical address.

In some implementations, the one or more processors are further configured to store the logical address to a sync database stored at the memory.

Some examples herein may be implemented using an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
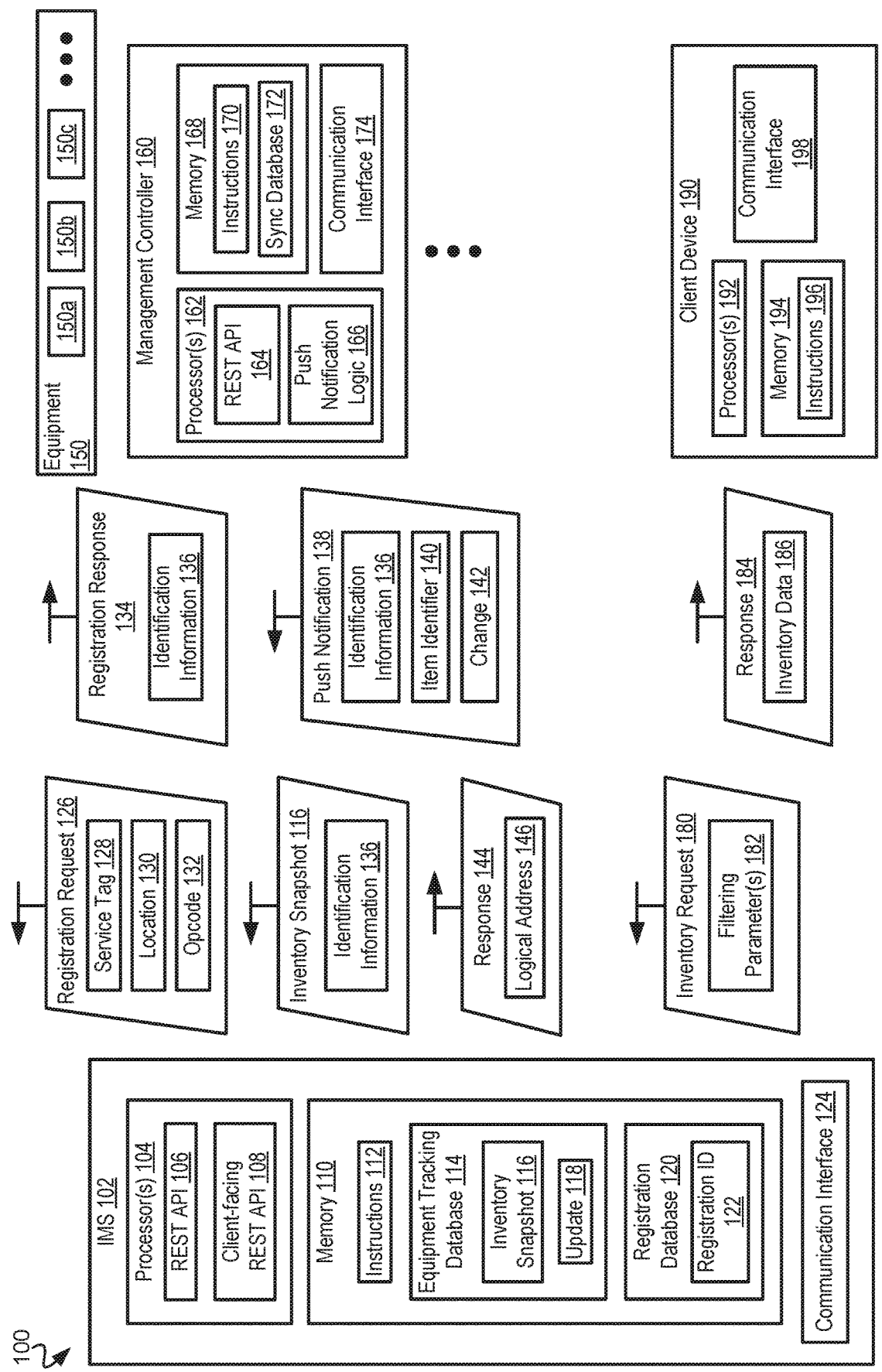
FIG. 1 is a block diagram illustrating an example of a system according to some aspects of the disclosure.

FIG. 1 is a block diagram illustrating an example of a system 100 according to some aspects of the disclosure. The system 100 may include one or more servers, such as an inventory management server (IMS) 102. The system 100 may further include one or more management controllers, such as a management controller 160. The system 100 may further include a client device 190. The client device 190 may correspond to or may be associated with a system administrator or other user or system.

The IMS 102 may include one or more processors 104, a memory 110 coupled to the one or more processors 104, and a communication interface 124 coupled to the one or more processors 104. In some implementations, the memory 110 may store instructions 112 executable by the one or more processors 104 to initiate, perform, or control one or more operations described herein.

The management controller 160 may include one or more processors 162, a memory 168 coupled to the one or more processors 162, and a communication interface 174 coupled to the one or more processors 162. In some implementations, the memory 168 may store instructions 170 executable by the one or more processors 162 to initiate, perform, or control one or more operations described herein. In some examples, the management controller 160 corresponds to, includes, or may be referred to as a baseboard management controller (BMC), a service processor, an embedded controller (EC), a storage enclosure processor, or a chassis processor.

In some implementations, the management controller 160 is assigned to monitor a set of equipment, such as equipment 150. Equipment (such as the equipment 150) may also be referred to herein as inventory. To illustrate, the equipment 150 may include one or more hardware components, such as computing devices (e.g., servers), processors, memories, network interface cards (NICs), communication devices (e.g., modems, routers, gateways, hubs, or switches), network infrastructure, one or more other hardware components, or a combination thereof. Alternatively or in addition, the equipment 150 may include software, such as an application or software module stored at a memory.

In some examples, the equipment 150 and the management controller 160 may be located in a datacenter. In some such examples, the equipment 150 may include or correspond to a server, a cloud computing device, a cloud storage device, or another computing device. Alternatively or in addition, the equipment 150 may include datacenter equipment, such as datacenter infrastructure equipment, heating, ventilation, and air conditioning (HVAC) equipment, storage equipment (such as a rack storage enclosure), electrical equipment (such as power delivery equipment), other equipment, or a combination thereof.

Further, although the example of FIG. 1 illustrates one set of equipment 150 and one management controller 160, other examples are also within the scope of the disclosure. To illustrate, the system 100 may further include a second management controller. The second management controller may be assigned to monitor some or all of the equipment 150, second equipment that is distinct from the equipment 150, or a combination therefore. In some examples, the second management controller and the second equipment are located in a second datacenter.

The client device 190 may include one or more processors 192, a memory 194 coupled to the one or more processors 192, and a communication interface 198 coupled to the one or more processors 192. In some implementations, the memory 194 may store instructions 196 executable by the one or more processors 192 to initiate, perform, or control one or more operations described herein. In some implementations, the client device 190 may include or correspond to a server, a desktop computer, a laptop computer, a tablet, a mobile device, or another type of computing device, as illustrative examples.

The communication interfaces 124, 174, and 198 may be configured to communicate with one another using one or more techniques. In some implementations, the communication interfaces 124, 174, and 198 may be configured to communicate with one another using one or more networks, such as one or more of a local area network (LAN), a wide area network (WAN), a wired network, a wireless network, or the Internet, as illustrative examples. The communication interfaces 124, 174, and 198 may be configured transmit or receive one or more messages or signals described herein.

In some implementations, the IMS 102 may correspond to a "standalone" server or to a "plugin" to another server. Further, depending on the implementation, the IMS 102 may be implemented as an on-premises device (e.g., within a datacenter that includes the management controller 160 and the equipment 150) or off-premises, such as in connection with a cloud computing implementation. Further, although the IMS 102 is illustrated in FIG. 1 as being external to the management controller 160, in some other implementations, one or more features of the IMS 102 may be implemented together with one or more features of the management controller 160 in a single server, controller, or device.

During operation, the IMS 102 may receive a registration request 126 associated with the management controller 160. In some examples, the registration request 126 is received from or is initiated by the client device 190. To illustrate, the client device 190 may receive user input identifying the management controller 160 and indicating that the IMS 102 is to register the management controller 160 for inventory tracking. In some examples, the client device 190 may directly provide the registration request 126 to the IMS 102. In some other examples, the management controller 160 may provide the registration request 126 to the IMS 102, such as in response to a command received from the client device 190.

In some examples, the registration request 126 may include one or more indications of the management controller 160, such as a service tag 128 associated with the management controller 160 or a location 130 of the management controller 160. Alternatively or in addition, the registration request 126 may include a registration request opcode, such as an opcode 132.

In some implementations, based on the registration request 126, the IMS 102 may determine a registration identifier (ID) 122 associated with the management controller 160. The IMS 102 may determine the registration ID 122 such as the registration ID 122 is unique to the management controller 160. For example, the IMS 102 may determine the registration ID 122 based on the identification information 136 (e.g., by hashing the identification information 136) or by selecting the registration ID 122 from a list of available registration IDs that are not assigned to other management controllers in communication with the IMS 102.

The IMS 102 may store the registration ID 122 to a registration database 120. The registration ID 122 may be unique to the management controller 160 within the registration database 120. For example, the registration database 120 may indicate other registration IDs associated with other respective management controllers, and each of the other registration IDs may be different from the registration ID 122. To further illustrate, the registration database 120 may include a lookup table (LUT) indicating management controllers (such as the management controller 160) and registration IDs (such as the registration ID 122) associated with the management controllers.

The IMS 102 may transmit a registration response 134 to the management controller 160 based on the registration request 126. For example, the registration response 134 may indicate that the management controller 160 is registered for inventory tracking with the IMS 102. In some examples, the registration response 134 includes identification information 136 usable to identify the management controller 160 in one or more subsequent communications. For example, the identification information 136 may include or correspond to the registration ID 122. In some other examples, the identification information 136 may be based on the registration ID 122, such as if the identification information 136 includes or corresponds to a hash of the registration ID 122 or a digitally signed version of the registration ID 122.

The management controller 160 may receive the registration response 134 from the IMS 102. The management controller 160 may store the identification information 136. For example, the management controller 160 may store the identification information 136 to the memory 168.

In some implementations, the management controller 160 may provide, based on the registration response 134, an inventory snapshot 116 to the IMS 102. For example, in some implementations, the management controller 160 may collect or access data that indicates characteristics of the equipment 150 and may transmit the data to the IMS 102 as the inventory snapshot 116. In some examples, the inventory snapshot 116 may indicate the identification information 136.

To further illustrate, in some implementations, the inventory snapshot 116 may indicate one or more of service tags associated with items of the equipment 150, part numbers associated with items of the equipment 150, serial numbers associated with items of equipment 150, addresses associated with items of the equipment 150 (such as media access control (MAC) addresses), descriptions of items of the equipment 150, or names of items of the equipment 150. Alternatively or in addition, the inventory snapshot 116 may indicate relationships associated with the equipment 150, which as whether one item of the equipment 150 is connected to another item of the equipment 150. Alternatively or in addition, the inventory snapshot 116 may indicate locations of items of the equipment 150, such as an identifier of one or more datacenters that include the equipment 150 or a location of a part within a datacenter, as illustrative examples.

The IMS 102 may receive the inventory snapshot 116 from the management controller 160. The IMS 102 may store the inventory snapshot 116. For example, the IMS 102 may store the inventory snapshot 116 to the memory 110, such as within an equipment tracking database 114 that may be stored at the memory 110.

In some other implementations, the management controller 160 may not transmit the inventory snapshot 116 to the IMS 102. For example, instead of providing a single inventory snapshot, the management controller 160 may provide "piecemeal" data to the IMS 102 associated with the equipment 150, such as by providing push notifications based on one or more of addition, removal, or modification to the equipment 150, as described further below.

In some circumstances, the equipment 150 may be subject to one or more modifications, such as a change 142 associated with the equipment 150. For example, one or more items (also referred to herein as components or parts) may be added to the equipment 150, removed from the equipment 150, or reconfigured. The management controller 160 may detect the change 142 associated with the equipment 150.

To illustrate, in some examples, the change 142 may include addition of first equipment 150*a* to the equipment 150. In some examples, the first equipment 150*a* may include one or more of a server, a cloud computing device, a cloud storage device, or other equipment. The management controller 160 may detect the addition of the equipment 150, such as by detecting a communication from the equipment 150 (e.g., via an Ethernet connection to the equipment 150 or via a wireless connection to the equipment 150). Alternatively or in addition, in some implementations, the first equipment 150*a* may include or correspond to a software program or application that is installed on a computing device, and the change 142 may include installation of the software program or application. In some examples, detecting the addition of the first equipment 150*a* may include receiving user input, such as if the management controller 160 receives user input specifying one or more characteristics of the first equipment 150*a*, such as a MAC address of the first equipment 150*a*, as an illustrative example.

Alternatively or in addition, in some examples, the change 142 may include removal of second equipment 150*b* from the equipment 150. The management controller 160 may detect the removal of the second equipment 150*b* from the equipment 150. In some examples, the management controller 160 may detect the removal of the second equipment 150*b* based on failure to receive a communication (e.g., a status message or a query response) from the second equipment 150*b* within a threshold time period (e.g., a threshold time period since receiving a prior communication from the second equipment 150*b* or since transmitting a query to the second equipment 150*b*). In some implementations, a failure of the second equipment 150*b* (e.g., a "crash") may constitute removal of the second equipment 150*b*. In some examples, detecting the removal of the second equipment 150*b* may include receiving user input specifying the removal of the second equipment 150*b* from the equipment 150.

Alternatively or in addition, in some examples, the change 142 may include modification of third equipment 150*c* of the equipment 150. As an illustrative example, the modification may include a software installation, software update, or repair of the third equipment 150*c*. As another illustrative example, the modification may include disconnection of the third equipment 150*c* from one device and reconnection of the third equipment 150*c* to another device. In some examples, the management controller 160 may detect the modification based on a change in one or more signals received from the third equipment 150*c* (or from a device that includes the third equipment 150*c*), such as a change in a software version number reported by the third equipment 150*c*. In some examples, detecting the modification may include receiving user input specifying the modification.

Based on detecting the change, the management controller 160 may transmit a push notification 138 to the IMS 102. For example, the management controller 160 may automatically transmit the push notification 138 without receiving a request for the push notification. The push notification 138 may include an indication of the change 142 and may further indicate the identification information 136. The push notification 138 may also include an item identifier 140 of an item associated with the change 142. For example, the item identifier 140 may indicate one or more of a service tag associated with the item, a part number of the item, a serial number of the item, a description of the item, or a name of the item. In some examples, the management controller 160 includes or executes push notification logic 166 to initiate transmission of the push notification 138.

The IMS 102 may receive the push notification 138 from the management controller 160. In some implementations, the IMS 102 may verify (e.g., authenticate) the management controller 160 based on information of the push notification 138, such as the identification information 136. For example, if the identification information 136 is invalid or incorrect, the IMS 102 may decline or reject the push notification 138, such as by issuing a message to the management controller 160 to retry the push notification 138 with correct identification information 136.

After authenticating the management controller 160, the IMS 102 may perform an update 118 of the equipment tracking database 114 based on the indication of the change 142 specified by the push notification 138. In some examples, the equipment tracking database 114 indicates the inventory snapshot 116, and the IMS 102 performs the update 118 to the inventory snapshot 116. In some examples, performing the update 118 may include one or more of adding a first indication of the first equipment 150*a* to the equipment tracking database 114, removing a second indication of the second equipment 150*b* from the equipment tracking database 114, or modifying one or more attributes associated with a third indication of the third equipment 150*c*.

In some implementations, the IMS 102 may transmit a response 144 to the push notification 138 to the management controller 160 (e.g., based on the update 118 to the equipment tracking database 114). In some examples, the update 118 is associated with a logical address 146 within the equipment tracking database of a part of the equipment 150, and the response 144 indicates the logical address 146. In some examples, the logical address 146 corresponds to a uniform resource indicator (URI) or a uniform resource locator (URL). To further illustrate, if the update 118 includes adding an entry to the equipment tracking database 114 based on addition of the first equipment 150*a* to the equipment 150, the IMS 102 may add the logical address 146 to equipment tracking database 114 to identify the first equipment 150*a*.

The management controller 160 may receive the response 144 from the IMS 102. In some implementations, the management controller 160 may store the logical address 146 to a sync database 172. The sync database 172 may include a lookup table (LUT) of logical addresses used by the IMS 102 to indicate parts of the equipment 150.

After storing the logical address 146 to the sync database 172, the management controller 160 may use the logical address 146 in one or more communications with the IMS 102. For example, based on detecting a modification to, or removal of, equipment associated with the logical address 146, the management controller 160 may use the logical address 146 to identify the equipment in a push notification to the IMS 102. As another example, in some circumstances, the IMS 102 may transmit to the management controller 160 a query or a command indicating the equipment using the logical address 146. For example, the query may request a current status of the equipment associated with the logical address 146, such as whether the equipment is in an active or standby state of operation, as an illustrative example.

Accordingly, by receiving push notifications from one or more management controllers (such as the management controller 160) based on a change in equipment (such as the change associated with the equipment), the equipment tracking database 114 may reflect real time or near-real time inventory data without querying of the management controllers, which may reduce network congestion, resource utilization, latency, and power consumption. In some examples, the IMS 102 may be referred to as a "zero-touch" centralized push-based datacenter inventory tracker. Further, the real time or near-real time inventory data may enhance one or more operations, such as operations initiated or performed by one or more client devices (such as the client device 190).

To illustrate, in some examples, the client device 190 may transmit an inventory request 180 to the IMS 102. The IMS 102 may receive the inventory request 180 and may access the equipment tracking database 114 based on the inventory request 180 to identify inventory data 186. The inventory data 186 may include data associated with at least some of the equipment 150. The IMS 102 may transmit, to the client device 190, a response 184 indicating the inventory data 186. The client device 190 may receive the response 184.

To further illustrate, the inventory request 180 may indicate one or more filtering parameters 182. In some examples, the one or more filtering parameters 182 may include or correspond to an indication of a particular datacenter, a type of component, a date range, a status request, a usage history request, one or more other criteria, or a combination thereof. The IMS 102 may access the equipment tracking database 114 to identify the inventory data 186 based on the one or more filtering parameters 182. In some examples, the inventory data 186 may indicate one or more of a movement history of an item within a datacenter, a usage history of the item, a current status associated with the item, a lifecycle of the item, a listing of management controllers that are registered with the IMS 102 (such as a listing of the registration database 120), or a listing of equipment associated with the management controllers, as illustrative examples.

As an additional example, the equipment tracking database 114 may be used in connection with a troubleshooting operation. For example, if one instance of a particular part is found to be faulty or subject to poor performance, the inventory request 180 may include a request to identify other information related to the part, such as other instances of the part and locations of the part within a datacenter (e.g., so the part can be replaced or refurbished). The response 184 may include such information. As a result, the need to manually "track down" instances of the part may be reduced or eliminated.

Alternatively or in addition, in some datacenters, parts may be relocated (or "repurposed") relatively frequently. By issuing push notifications to the IMS 102, such relocated parts may be tracked automatically and in real time or near-real time. As a result, the need to manually record relocation (or repurposing) of such parts may be reduced or eliminated.

In some circumstances, the management controller 160 may deregister from the IMS 102. In some examples, the management controller 160 may initiate deregistration based on retirement of a server that includes or that is managed by the management controller 160, based on relocation of the server to a different datacenter (which may be associated with a different IMS), or based on expiration of a service (such as expiration of a "trial" service period associated with the IMS 102). In such examples, the management controller 160 may send a deregistration request to the IMS 102. The deregistration request may include the identification information 136. Based on the deregistration request, the IMS 102 may delete information associated with the management controller 160 from the registration database 120, such as by deleting the registration ID 122 from the registration database 120.

In some implementations, one or more operations described herein may be performed using a representational state transfer (REST) protocol. For example, the IMS 102 may expose a REST application program interface (API) 106 to the management controller 160. The REST API 106 may enable one or more of registration of the management controller 160 with the IMS 102, deregistration of the management controller 160, addition of inventory to the equipment tracking database 114, updating of the inventory at the equipment tracking database 114, or deletion of inventory from the equipment tracking database 114. To further illustrate, exposing the REST API 106 to the management controller 160 may enable the management controller 160 to provide one or more of the registration request 126 or the push notification 138 to the IMS 102. Alternatively or in addition, the management controller 160 may expose a REST API 164 to the IMS 102 to enable the IMS 102 to provide the registration response 134 to the management controller 160.

Further, in some examples, the IMS 102 may expose a client-facing REST API 108 to the client device 190 to enable one or more operations described herein. To illustrate, the IMS 102 may expose the client-facing REST API 108 to the client device 190 to enable communication of the inventory request 180. Alternatively or in addition, the client device 190 may expose a REST API to the IMS 102 to enable the IMS 102 to provide the response 184 to the client device 190.

To further illustrate, the example of Table 1 provides examples of operations that may be supported within the system 100. In some implementations, the operations of Table 1 may be performed according to a REST protocol. Each operation of Table 1 may be associated with a target address, such as a uniform resource identifier (URI).

TABLE 1

| Operation | Example URI | Description |
|---|---|---|
| GET | /ims/v1/InventoryManagementService/ | Metadata of the IMS. |
| POST | /ims/v1/InventoryManagementService/ Actions/InventoryManagementService.RegisterBMC | Register a BMC with the IMS. Returns RegistrationId to be passed in header for POST. Create and DELETE as XRegistrationId. |
| POST | /ims/v1/InventoryManagementService/Actions/ InventoryManagementService.DeRegisterBMC | Unregister a BMC from the IMS. Delete all parts which were tagged with the BMC. |
| GET | /ims/v1/InventoryManagementService/ RegisteredBMCs | Details of the registered BMCs. |
| GET | /ims/v1/InventoryManagementService/Parts | GET collection of parts. |
| POST | /ims/v1/InventoryManagementService/Parts | Add a part entry to IMS inventory. |
| GET | /ims/v1/InventoryManagementService/ Parts/{PartId} | Get details of a part. |
| DELETE | /ims/v1/InventoryManagementService/ Parts/{PartId} | Delete a part entry to the IMS Inventory. |

In some implementations, one or more operations described may be used in connection with an integrated remote access controller. The example of Table 2 illustrates examples of such operations.

TABLE 2

| Operation | Example URI | Description |
|---|---|---|
| POST | /redfish/v1/Managers/iDRAC.Embedded.1/ Oem/Dell/DelliDRACCardService/Actions/ DelliDRACCardService.RegisteriDRACWithIMS | Registers iDRAC with the IMS whose IP is sent in the payload. RegistrationId returned in the response along with the IP address of the IMS stored internally to be used for updating inventory information with the IMS. |
| POST | /redfish/v1/Managers/iDRAC.Embedded.1/ Oem/Dell/DelliDRACCardService/Actions/ DelliDRACCardService.DeRegisteriDRACWithIMS | Unregisters the BMC from the IMS. |

Figure 2:
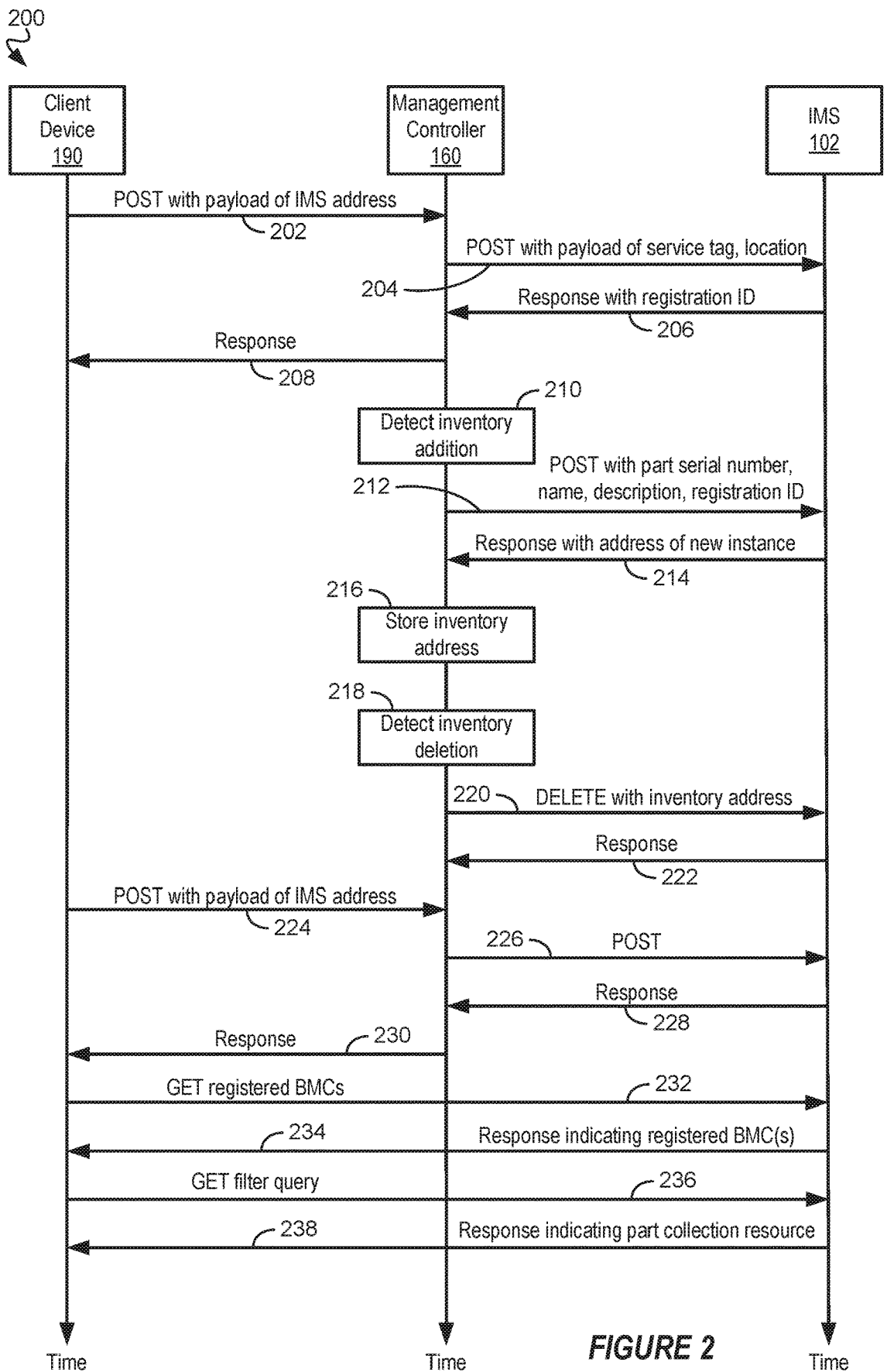
FIG. 2 illustrates examples of operations that may be performed by the system of FIG. 1 according to some aspects of the disclosure.

To further illustrate, some examples described in connection with FIG. 2 are described with reference to a REST protocol. Other examples are also within the scope of the disclosure.

FIG. 2 is a diagram illustrating examples of operations 200 that may be performed by the system 100 of FIG. 1 according to some aspects of the disclosure. In some examples, the operations 200 may be performed by the IMS 102, the management controller 160, and the client device 190 according to some aspects. In some examples, the operations 200 are performed according to a REST protocol. Other examples are also within the scope of the disclosure.

The operations 200 may include performing a POST operation, at 202. For example, the client device 190 may transmit, to the management controller 160, a POST request having a payload that indicates an address associated with the IMS 102. The address may correspond to an Internet Protocol (IP) address of the IMS 102, as an illustrative example. In some examples, the POST request may include or correspond to a command to perform registration with the IMS 102.

The operations 200 may further include performing a POST operation, at 204. For example, the management controller 160 may transmit a POST request to the IMS 102. The POST request may indicate one or more of a service tag associated with the management controller 160, a location of the management controller 160, or a registration request opcode. In some examples, the POST request includes or corresponds to the registration request 126.

The operations 200 may further include transmitting a response, at 206. For example, the IMS 102 may transmit the registration response 134 to the management controller 160. The registration response 134 may include an acknowledgement message, such as a hypertext transfer protocol (HTTP) 200 response code.

The operations 200 may further include transmitting a response, at 208. For example, the management controller 160 may transmit the response to the client device 190 to indicate a result of the registration process. The response may include an acknowledgement message, such as an HTTP 200 response code.

The operations 200 may further include detecting addition of inventory, at 210. As an illustrative example, the management controller 160 may detect addition of the first equipment 150a to the equipment 150.

The operations 200 may further include performing a POST operation associated with the added inventory, at 212. For example, the management controller 160 may transmit a POST request to the IMS 102 indicating one or more of a service tag associated with the added inventory, a part number of the added inventory, a serial number of the added inventory, a description of the added inventory, or a name of the added inventory. In some examples, the POST request may include the identification information 136. In some implementations, the identification information 136 includes, corresponds to, or is based on a BMC IP address of the management controller 160. In some examples, the POST request includes or corresponds to the push notification 138 or another push notification.

The operations 200 may further include transmitting a response, at 214. In some examples, the response includes an address (e.g., a uniform resource indicator (URI) or uniform resource locator (URL)) associated with the added inventory within the equipment tracking database 114. The response may include a message indicating success of creation of a resource corresponding to the address. The message may include or correspond to an HTTP 201 response code. In some examples, the response corresponds to the response 144, and the address corresponds to the logical address 146.

The operations 200 may further include storing an address of the inventory, at 216. For example, the management controller 160 may store an indication of the URI or URL to the sync database 172.

The operations 200 may further include detecting deletion of inventory, at 218. In an illustrative example, the management controller 160 may detect removal of the first equipment 150a.

The operations 200 may further include performing a DELETE operation, at 220. For example, the management controller 160 may transmit a DELETE request to the IMS 102 indicating one or more of a service tag associated with the deleted inventory, a part number of the deleted inventory, a serial number of the deleted inventory, a description of the deleted inventory, or a name of the deleted inventory. In some examples, the DELETE request may include the address (e.g., URI or URL) associated with the deleted inventory. In some examples, the DELETE request includes or corresponds to the push notification 138 or another push notification.

The operations 200 may further include transmitting a response, at 222. For example, the IMS 102 may transmit the response to the management controller 160 to indicate success of the DELETE operation. The response may include an acknowledgement message, such as an HTTP 200 response code.

The operations 200 may further include performing a POST operation, at 224. For example, the client device 190 may transmit, to the management controller 160, a POST request having a payload that indicates the address (e.g., IP address) associated with the IMS 102. In some examples, the POST request may include or correspond to a command to perform deregistration with the IMS 102. For example, in some circumstances, the client device 190 may initiate deregistration of the management controller 160 from the IMS 102, such as if inventory tracking is to be transferred to another device other than the IMS 102.

The management controller 160 may transmit a POST request to the IMS 102 to initiate deregistration, at 226, and may receive a response from the IMS 102, at 228. The response may include an acknowledgement message, such as an HTTP 200 response code, indicating success of the deregistration. The management controller 160 may transmit a response including an acknowledgement message, such as an HTTP 200 response code, indicating success of the deregistration, at 230.

The operations 200 may further include performing a GET operation, at 232. For example, the client device 190 may transmit a GET request to the IMS 102 requesting a listing of management controllers that are registered with the IMS 102. The IMS 102 may transmit a response, at 234. The response may include the listing of management controllers that are registered with the IMS 102.

The operations 200 may further include performing a GET operation, at 236. For example, the client device 190 may transmit a GET request to the IMS 102 requesting inventory data. The GET request may include or correspond to the inventory request 180. The IMS 102 may transmit a response, at 238 indicating a part collection resource, which may include or correspond to the inventory data 186. In some examples, the GET request indicates a filter query (such as the one or more filtering parameters 182), and the IMS 102 accesses the equipment tracking database 114 based on the filter query to identify the part collection resource.

One or more techniques described herein may improve performance of a system, such as the system 100 of FIG. 1. For example, by using push notifications to the IMS 102 (e.g., instead of queries to BMCs by a system administrator), an amount of messaging in the system 100 may be reduced as compared to other techniques. For example, an amount of messaging may be reduced as compared to a system in which a system administrator transmits a query to a BMC to obtain information on system devices. As a result, a load on BMCs may be reduced as compared to other systems, and network congestion may be reduced. Further, use of push notifications may reduce transmission of redundant or unhelpful information, which may occur in some conventional systems when a BMC has no new updated information to report in response to a query.

Further, some aspects described herein may reduce an amount of stored credentials and other information stored by a system administrator, which may increase efficiency and network security. To illustrate, in some conventional systems, each system administrator may maintain management information, such as an Internet Protocol (IP) address or other credentials of a BMC, which system administrators may use to query the BMC. Such credentials may occasionally change over time (such as due to a change in IP address), which may introduce delays or difficulty in querying the BMC. In some aspects of the disclosure, the IMS 102 may centrally store such information and may receive push notifications from BMCs (such as the push notification 138 from the management controller 160) in response to changes (such as BMC credential changes), which may reduce or avoid querying based on incorrect or outdated information (e.g., due to a change in IP address of the management controller 160). Further, reducing or avoiding storage of such information by system administrators may increase network security in some cases (e.g., by reducing or avoiding storage of credentials externally to the system 100).

Figure 3:
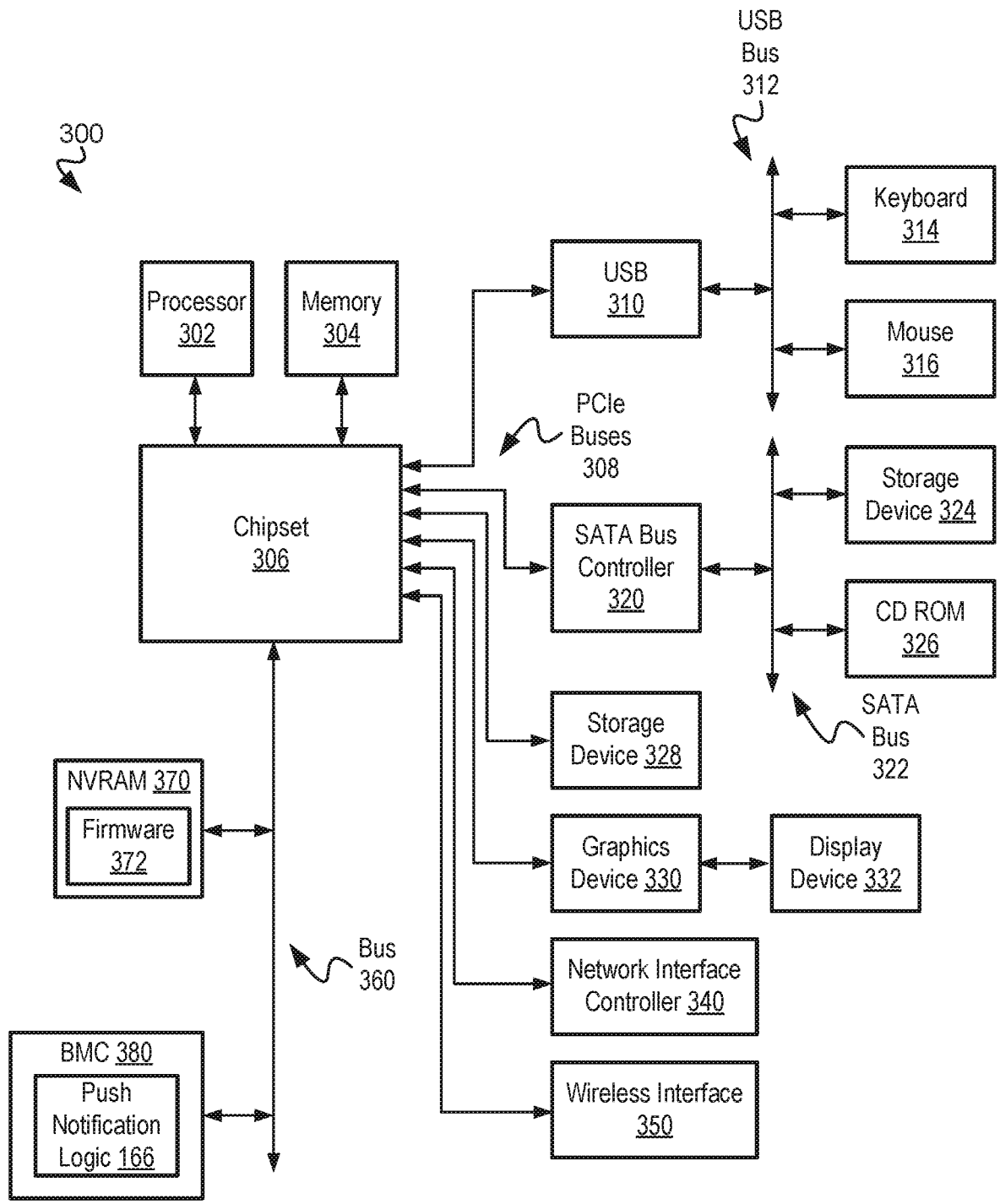
FIG. 3 is a schematic block diagram of an example of an information handling system according to some aspects of the disclosure.

FIG. 3 depicts an illustrative example of an information handling system 300 according to some aspects of the disclosure. In some examples, one or more features of the information handling system 300 may be implemented using one or more features described with reference to FIG. 1, as described further below.

Information handling system 300 may include a processor 302 (e.g., a central processing unit (CPU)), a memory 304 (e.g., a dynamic random-access memory (DRAM)), and a chipset 306. In some examples, one or more of the processor 302, the memory 304, or the chipset 306 may be included on a motherboard (also referred to as a mainboard), which may include a printed circuit board (PCB) with embedded conductors organized as transmission lines between any of the processor 302, the memory 304, the chipset 306, or other components of the information handling system 300. The components may be coupled to the motherboard through packaging connections such as a pin grid array (PGA), ball grid array (BGA), land grid array (LGA), surface-mount technology, and/or through-hole technology. In some embodiments, one or more of the processor 302, the memory 304, the chipset 306, or other components may be organized as a system on chip (SoC).

The processor 302 may execute program code by accessing instructions loaded into memory 304 from a storage device, may execute the instructions to operate on data also loaded into memory 304 from a storage device, and may generate output data that is stored to memory 304 or sent to another component. The processor 302 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 302 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 306 may facilitate the transfer of data between the processor 302, the memory 304, and other components. In some embodiments, chipset 306 may include two or more integrated circuits (ICs), such as a northbridge controller coupled to the processor 302, the memory 304, and a southbridge controller, with the southbridge controller coupled to the other components such as universal serial bus (USB) controller 310, a SATA bus controller 320, and PCIe buses 308. The chipset 306 may couple to other components through one or more PCIe buses 308.

Some components may be coupled to one bus line of the PCIe buses 308, whereas some components may be coupled to more than one bus line of the PCIe buses 308. One example component is the USB controller 310, which may interface the chipset 306 to a USB bus 312. The USB bus 312 may couple input/output components, such as a keyboard 314 and a mouse 316, and also other components, such as USB flash drives, or another information handling system. Another example component is the SATA bus controller 320, which may couple the chipset 306 to a SATA bus 322. The SATA bus 322 may facilitate efficient transfer of data between the chipset 306 and components coupled to the chipset 306 and a storage device 324 (e.g., a hard disk drive (HDD) or solid-state disk drive (SDD)) and/or a compact disc read-only memory (CD-ROM) 326. The PCIe buses 308 may also couple the chipset 306 directly to a storage device 328 (e.g., a solid-state disk drive (SDD)). A further example of an example component is a graphics device 330 (e.g., a graphics processing unit (GPU)) for generating output to a display device 332, a network interface controller (NIC) 340, and/or a wireless interface 350 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example, chipset 306 may be directly connected to an individual end point via a PCIe root port within the chipset and a point-to-point topology as shown in FIG. 3.

The chipset 306 may also be coupled to a bus 360, which may couple the chipset 306 to one or more system management components. For example, a non-volatile random-access memory (NVRAM) 370 storing firmware 372 may be coupled to the bus 360. As another example, a controller, such as a baseboard management controller (BMC) 380, may be coupled to the chipset 306 through the bus 360. BMC 380 may be referred to as a service processor or embedded controller (EC). Capabilities and functions provided by BMC 380 may vary based on the type of information handling system. For example, the term baseboard management system may be used to describe an embedded processor included at a server, while an embedded controller may be found in a consumer-level device. As disclosed herein, BMC 380 may represent a processing device different from processor 302, which provides various management functions for information handling system 300. For example, an embedded controller may be responsible for power management, cooling management, and the like. An embedded controller included at a data storage system may be referred to as a storage enclosure processor or a chassis processor.

Information handling system 300 may include additional processors that are configured to provide localized or specific control functions, such as a battery management controller. Bus 360 can include one or more buses, such as a Serial Peripheral Interface (SPI) bus, an Inter-Integrated Circuit (I2C) bus, a system management bus (SMBUS), a power management bus (PMBUS), or the like. BMC 380 may be configured to provide out-of-band access to devices at information handling system 300. Out-of-band access in the context of the bus 360 may refer to operations performed prior to execution of firmware 372 by processor 302 to initialize operation of the information handling system 300.

Firmware 372 may include instructions executable by processor 302 to initialize and test the hardware components of information handling system 300. For example, the instructions may cause the processor 302 to execute a power-on self-test (POST). The instructions may further cause the processor 302 to load a boot loader or an operating system (OS) from a mass storage device. Firmware 372 additionally may provide an abstraction layer for the hardware, such as a consistent way for application programs and operating systems to interact with the keyboard, display, and other input/output devices. When power is first applied to information handling system 300, the system may begin a sequence of initialization procedures, such as a boot procedure or a secure boot procedure. During the initialization sequence, also referred to as a boot sequence, components of information handling system 300 may be configured and enabled for operation and device drivers may be installed. Device drivers may provide an interface through which other components of information handling system 300 can communicate with a corresponding device. The firmware 372 may include a basic input-output system (BIOS) and/or include a unified extensible firmware interface (UEFI). Firmware 372 may also include one or more firmware modules of the information handling system 300. Additionally, configuration settings for the firmware 372 and firmware of the information handling system 300 may be stored in the NVRAM 370. NVRAM 370 may, for example, be a non-volatile firmware memory of the information handling system 300 and may store a firmware memory map namespace of the information handling system. NVRAM 370 may further store one or more container-specific firmware memory map namespaces for one or more containers concurrently executed by the information handling system.

Information handling system 300 may include additional components and additional buses, not shown for clarity. For example, information handling system 300 may include multiple processor cores (either within processor 302 or separately coupled to the chipset 306 or through the PCIe buses 308), audio devices (such as may be coupled to the chipset 306 through one of the PCIe buses 308), or the like. While a particular arrangement of bus technologies and interconnections is illustrated for the purpose of example, one of skill will appreciate that the techniques disclosed herein are applicable to other system architectures. Information handling system 300 may include multiple processors and/or redundant bus controllers. In some examples, one or more components may be integrated together in an integrated circuit (IC), which may include circuitry built on a common substrate. For example, portions of chipset 306 can be integrated within processor 302. Additional components of information handling system 300 may include one or more storage devices that may store machine-executable code, one or more communications ports for communicating with external devices, and various input and output (I/O) devices, such as a keyboard, a mouse, and a video display.

In some embodiments, processor 302 may include multiple processors, such as multiple processing cores for parallel processing by the information handling system 300. For example, the information handling system 300 may include a server comprising multiple processors for parallel processing. In some embodiments, the information handling system 300 may support virtual machine (VM) operation, with multiple virtualized instances of one or more operating systems executed in parallel by the information handling system 300. For example, resources, such as processors or processing cores of the information handling system may be assigned to multiple containerized instances of one or more operating systems of the information handling system 300 executed in parallel. A container may, for example, be a virtual machine executed by the information handling system 300 for execution of an instance of an operating system by the information handling system 300. Thus, for example, multiple users may remotely connect to the information handling system 300, such as in a cloud computing configuration, to utilize resources of the information handling system 300, such as memory, processors, and other hardware, firmware, and software capabilities of the information handling system 300. Parallel execution of multiple containers by the information handling system 300 may allow the information handling system 300 to execute tasks for multiple users in parallel secure virtual environments.

In some examples, BMC 380 may include or correspond to the management controller 160 of FIG. 1. BMC 380 may include or execute push notification logic 166 to initiate transmission (e.g., via wireless interface 350 or via another interface) of the push notification 138. Further, one or more of processor 302, memory 304, chipset 306, USB controller 310, USB bus 312, PCIe buses 308, keyboard 314, mouse 316, SATA bus controller 320, SATA bus 322, storage device 324, CD ROM 326, storage device 328, graphics device 330, display device 332, network interface controller 340, wireless interface 350, bus 360, NVRAM 370, or firmware 372 may be included in equipment 150 of FIG. 1 (and may be managed by BMC 380, which may correspond to management controller 160). Accordingly, BMC 380 may execute push notification logic 166 to notify the IMS 102 of addition, removal, or modification associated with one or more of processor 302, memory 304, chipset 306, USB controller 310, USB bus 312, PCIe buses 308, keyboard 314, mouse 316, SATA bus controller 320, SATA bus 322, storage device 324, CD ROM 326, storage device 328, graphics device 330, display device 332, network interface controller 340, wireless interface 350, bus 360, NVRAM 370, or firmware 372.

Alternatively or in addition, one or more features of FIG. 3 may correspond one or more features of the IMS 102. For example, in some implementations, the processor 302 may correspond to the one or more processors 104, and the memory 304 may correspond to the memory 110. To further illustrate, in some implementations, features of both the IMS 102 and the management controller 160 may be integrated within information handling system 300.

Alternatively or in addition, one or more features of FIG. 3 may correspond one or more features of the client device 190. For example, in some implementations, the processor 302 may correspond to the one or more processors 192, and the memory 304 may correspond to the memory 194. In some examples, a user may utilize display device 332, keyboard 314, and mouse 316 to initiate transmission of the inventory request 180, such as by using a graphical user interface (GUI) of display device 332 to select the one or more filtering parameters 182 for the inventory request 180.

Figure 4:
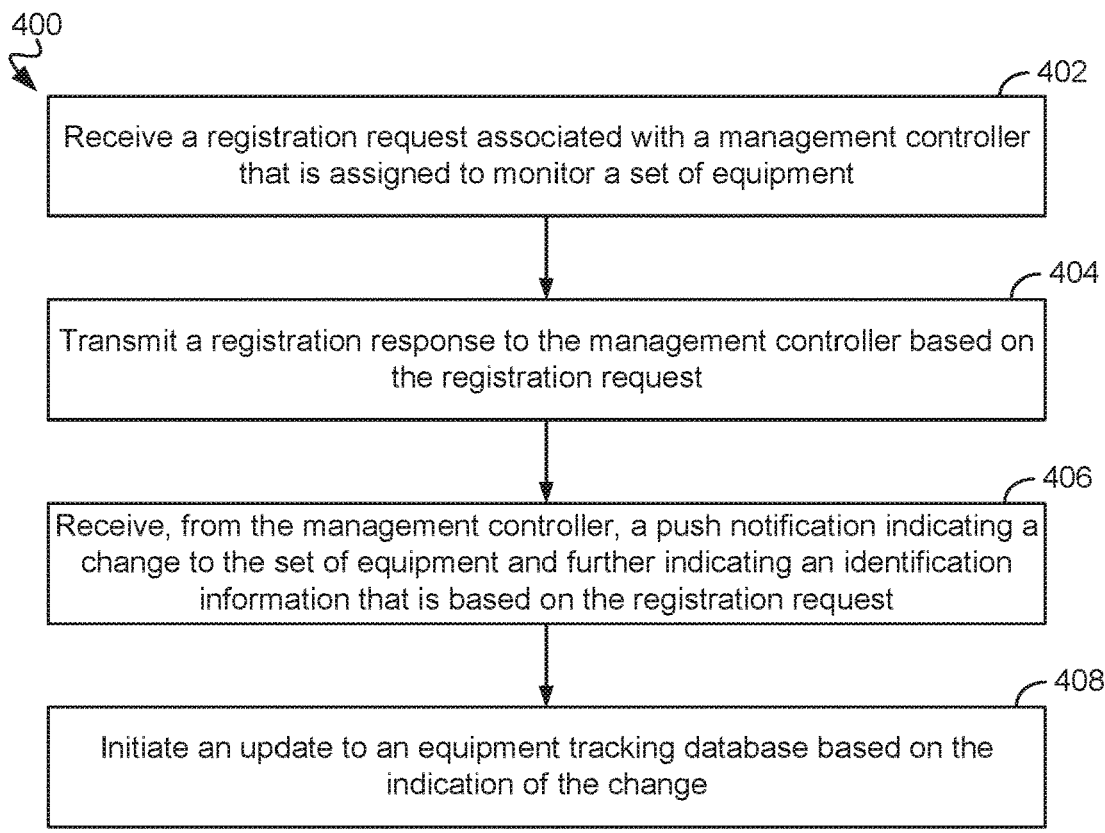
FIG. 4 is a flow chart of an example of a method according to some aspects of the disclosure.

FIG. 4 is a flow chart of an example of a method 400 according to some aspects of the disclosure. In some examples, the method 400 is performed by the IMS 102 of FIG. 1. Alternatively or in addition, the method 400 may be performed by the information handling system 300 of FIG. 3.

The method 400 includes receiving a registration request associated with a management controller that is assigned to monitor a set of equipment, at 402. For example, the IMS 102 may receive the registration request 126 associated with the management controller 160, which may be assigned to monitor the equipment 150.

The method 400 further includes transmitting a registration response to the management controller based on the registration request, at 404. For example, the IMS 102 may transmit the registration response 134 to the management controller 160.

The method 400 further includes receiving, from the management controller, a push notification indicating a change to the set of equipment and further indicating an identification information that is based on the registration request, at 406. For example, the IMS 102 may receive the push notification 138 indicating the change 142 to the equipment 150 and further indicating the identification information 136.

The method 400 further includes initiating an update to an equipment tracking database based on the indication of the change, at 408. For example, the IMS 102 may initiate the update 118 to the equipment tracking database 114 based on the indication of the change 142.

Figure 5:
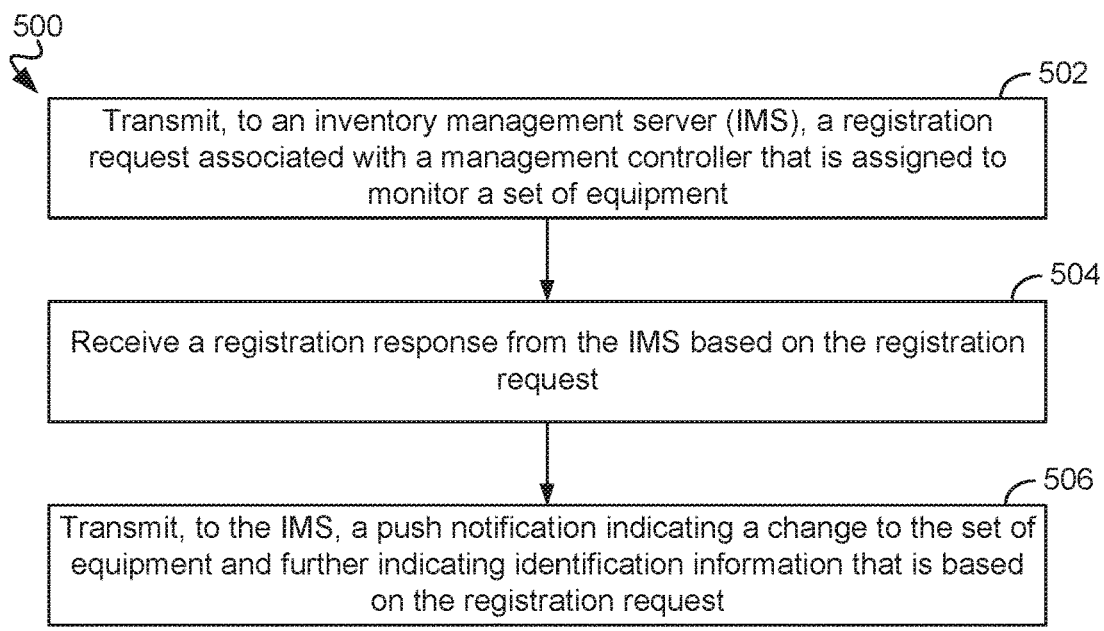
FIG. 5 is a flow chart of another example of a method according to some aspects of the disclosure.

FIG. 5 is a flow chart of another example of a method 500 according to some aspects of the disclosure. In some examples, the method 500 is performed by the management controller 160 of FIG. 1. Alternatively or in addition, the method 400 may be performed by the information handling system 300 of FIG. 3, such as by the BMC 380.

The method 500 includes transmitting, to an inventory management server (IMS), a registration request associated with a management controller that is assigned to monitor a set of equipment, at 502. For example, the management controller 160 may transmit, to the IMS 102, the registration request 126.

The method 500 further includes receiving a registration response from the IMS based on the registration request, at 504. For example, the management controller 160 may receive the registration response 134 from the IMS 102.

The method 500 further includes transmitting, to the IMS, a push notification indicating a change to the set of equipment and further indicating identification information that is based on the registration request, at 506. For example, the management controller 160 may transmit the push notification 138 indicating the change 142 to the equipment 150 and further indicating the identification information 136.

According to some further aspects, in a first aspect, an apparatus includes a memory and one or more processors coupled to the memory. The one or more processors are configured to receive a registration request associated with a management controller that is assigned to monitor a set of equipment. The one or more processors are further configured to transmit a registration response to the management controller based on the registration request and to receive, from the management controller, a push notification indicating a change to the set of equipment and further indicating an identification information that is based on the registration request. The one or more processors are further configured to initiate an update to an equipment tracking database based on the indication of the change.

In a second aspect in addition to the first aspect, the change to the set of equipment includes one or more of addition of first equipment to set of equipment, removal of second equipment from the set of equipment, or modification of third equipment of the set of equipment.

In a third aspect in addition to one or more of the first through second aspects, the one or more processors are further configured to add a first indication of the first equipment to the equipment tracking database, remove a second indication of the second equipment from the equipment tracking database, modify one or more attributes associated with a third indication of the third equipment at the equipment tracking database, or a combination thereof.

In a fourth aspect in addition to one or more of the first through fourth aspects, the registration request further indicates one or more of a service tag associated with the management controller, a location of the management controller, or a registration request opcode.

In a fifth aspect in addition to one or more of the first through fourth aspects, the one or more processors are further configured to, based on the registration request, determine a registration identifier (ID) associated with the management controller, where the identification information includes or is based on the registration ID, and to store the registration ID to a registration database, where the registration ID is unique to the management controller within the registration database.

In a sixth aspect in addition to one or more of the first through fifth aspects, the one or more processors are further configured to expose a representational state transfer (REST) application program interface (API) to the management controller to enable the management controller to provide one or more of the registration request or the push notification.

In a seventh aspect in addition to one or more of the first through sixth aspects, the one or more processors are further configured to, based on the registration response and prior to receiving the push notification, receive, from the management controller, an inventory snapshot of the set of equipment and to store the inventory snapshot to the equipment tracking database.

In an eighth aspect in addition to one or more of the first through seventh aspects, the push notification indicates one or more of a service tag associated with an item of the set of equipment, a part number of the item, a serial number of the item, a description of the item, or a name of the item.

In a ninth aspect in addition to one or more of the first through eighth aspects, the one or more processors are further configured to receive an inventory request from a client device, to access, based on the inventory request, the equipment tracking database to identify inventory data, and to transmit, to the client device, a response indicating the inventory data.

In a tenth aspect in addition to one or more of the first through ninth aspects, the inventory request indicates one or more filtering parameters, and the one or more processors are further configured to access the equipment tracking database to identify the inventory data based on the one or more filtering parameters.

In an eleventh aspect in addition to one or more of the first through tenth aspects, the one or more processors are further configured to expose a client-facing representational state transfer (REST) application program interface (API) to the client device to enable communication of the inventory request.

In a twelfth aspect in addition to one or more of the first through eleventh aspects, the inventory data indicates one or more of a movement history of an item within a datacenter, a usage history of the item, a current status associated with the item, a lifecycle of the item, a listing of management controllers that are associated with the equipment tracking database, or a listing of equipment associated with the management controllers.

In a thirteenth aspect, a method includes receiving a registration request associated with a management controller that is assigned to monitor a set of equipment. The method further includes transmitting a registration response to the management controller based on the registration request and receiving, from the management controller, a push notification indicating a change to the set of equipment and further indicating identification information that is based on the registration request. The method further includes initiating an update to an equipment tracking database based on the indication of the change.

In a fourteenth aspect in addition to the fifteenth aspect, the change to the set of equipment includes one or more of addition of first equipment to set of equipment, removal of second equipment from the set of equipment, or modification of third equipment of the set of equipment.

In a fifteenth aspect in addition to one or more of the thirteenth through fourteenth aspects, the method further includes performing one or more of adding a first indication of the first equipment to the equipment tracking database, removing a second indication of the second equipment from the equipment tracking database, or modifying one or more attributes associated with a third indication of the third equipment at the equipment tracking database.

In a sixteenth aspect in addition to one or more of the thirteenth through fifteenth aspects, the registration request further indicates one or more of a service tag associated with the management controller, a location of the management controller, or a registration request opcode.

In a seventeenth aspect, an information handling system includes a memory and one or more processors coupled to the memory. The one or more processors are configured to initiate transmission, to an inventory management server (IMS), of a registration request associated with a management controller that is assigned to monitor a set of equipment. The one or more processors are further configured to receive a registration response from the IMS based on the registration request and to transmit, to the IMS, a push notification indicating a change to the set of equipment and further indicating identification information that is based on the registration request.

In an eighteenth aspect in addition to the seventeenth aspect, the one or more processors are further configured to receive, based on an update to an equipment tracking database that is based on the push notification, a response to the push notification from the IMS.

In a nineteenth aspect in addition to one or more of the seventeenth through eighteenth aspects, the update to the equipment tracking database is associated with a logical address within the equipment tracking database of a part of the set of equipment, and wherein the response indicates the logical address.

In a twentieth aspect in addition to one or more of the seventeenth through nineteenth aspects, the one or more processors are further configured to store the logical address to a sync database stored at the memory.

A diagram described herein (such as the ladder diagram of FIG. 2 and the flow chart diagrams of FIGS. 3 and 4) may be generally set forth as a logical flow chart diagram. As such, the depicted order and labeled steps may be indicative of aspects of the disclosed method. Other steps and methods may also be used to implement one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

One or more operations described herein may be described as being performed by a controller or processor. Such operations may be performed by any circuit configured to perform the operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus for use in an inventory management system (IMS), the apparatus comprising:
   a memory; and
   one or more processors coupled to the memory, wherein the one or more processors are configured to:
   receive, from a baseboard management controller (BMC), a registration request associated with the BMC, wherein the BMC is assigned to monitor a set of equipment;
   transmit a registration response to the BMC based on the registration request;
   receive, from the BMC, a push notification indicating a change to the set of equipment and further indicating identification information that is based on the registration request;
   initiate an update to an equipment tracking database based on the indication of the change; and
   receive, from a client device, a request for a listing of BMCs that are associated with the equipment tracking database, the listing including an indication of the BMC.

2. The apparatus of claim 1, wherein the change to the set of equipment includes one or more of addition of first equipment to set of equipment, removal of second equipment from the set of equipment, or modification of third equipment of the set of equipment.

3. The apparatus of claim 2, wherein the one or more processors are further configured to add a first indication of the first equipment to the equipment tracking database, remove a second indication of the second equipment from the equipment tracking database, modify one or more attributes associated with a third indication of the third equipment at the equipment tracking database, or a combination thereof.

4. The apparatus of claim 1, wherein the registration request further indicates one or more of a service tag associated with the BMC, a location of the BMC, or a registration request opcode.

5. The apparatus of claim 1, wherein the one or more processors are further configured to:
   based on the registration request, determine a registration identifier (ID) associated with the BMC, wherein the identification information includes or is based on the registration ID; and
   store the registration ID to a registration database, wherein the registration ID is unique to the BMC within the registration database.

6. The apparatus of claim 1, wherein the one or more processors are further configured to expose a representational state transfer (REST) application program interface (API) to the BMC to enable the BMC to provide one or more of the registration request or the push notification.

7. The apparatus of claim 1, wherein the one or more processors are further configured to:
   based on the registration response and prior to receiving the push notification, receive, from the BMC, an inventory snapshot of the set of equipment; and
   store the inventory snapshot to the equipment tracking database.

8. The apparatus of claim 1, wherein the push notification indicates one or more of a service tag associated with an item of the set of equipment, a part number of the item, a serial number of the item, a description of the item, or a name of the item.

9. The apparatus of claim 1, wherein the one or more processors are further configured to:
   receive an inventory request from a client device;
   based on the inventory request, access the equipment tracking database to identify inventory data; and
   transmit, to the client device, a response indicating the inventory data.

10. The apparatus of claim 9, wherein the inventory request indicates one or more filtering parameters, and wherein the one or more processors are further configured to access the equipment tracking database to identify the inventory data based on the one or more filtering parameters.

11. The apparatus of claim 9, wherein the one or more processors are further configured to expose a client-facing representational state transfer (REST) application program interface (API) to the client device to enable communication of the inventory request.

12. The apparatus of claim 9, wherein the inventory data indicates one or more of a movement history of an item within a datacenter, a usage history of the item, a current status associated with the item, a lifecycle of the item, the listing of the BMCs, or a listing of equipment associated with the BMC.

13. A method of operation of an inventory management system (IMS), the method comprising:
receiving, from a baseboard management controller (BMC), a registration request associated with the BMC, wherein the BMC is assigned to monitor a set of equipment;
transmitting a registration response to the BMC based on the registration request;
receiving, from the BMC, a push notification indicating a change to the set of equipment and further indicating identification information that is based on the registration request;
initiating an update to an equipment tracking database based on the indication of the change; and
receiving, from a client device, a request for a listing of BMCs that are associated with the equipment tracking database, the listing including an indication of the BMC.

14. The method of claim 13, wherein the change to the set of equipment includes one or more of addition of first equipment to set of equipment, removal of second equipment from the set of equipment, or modification of third equipment of the set of equipment.

15. An information handling system comprising:
a memory; and
one or more processors coupled to the memory, wherein the one or more processors are configured to:
initiate transmission, to an inventory management server (IMS), of a registration request associated with a baseboard management controller (BMC) that is assigned to monitor a set of equipment;
receive a registration response from the IMS based on the registration request; and
transmit, to the IMS, a push notification indicating a change to the set of equipment and further indicating identification information that is based on the registration request,
wherein one or more of the registration request or the push notification enable the IMS to maintain a listing of BMCs that are associated with an equipment tracking database, the listing including an indication of the BMC.

16. The information handling system of claim 15, wherein the one or more processors are further configured to receive, based on an update to the equipment tracking database that is based on the push notification, a response to the push notification from the IMS.

17. The information handling system of claim 16, wherein the update to the equipment tracking database is associated with a logical address within the equipment tracking database of a part of the set of equipment, and wherein the response indicates the logical address.

18. The information handling system of claim 17, wherein the one or more processors are further configured to store the logical address to a sync database stored at the memory.

19. The apparatus of claim 1, wherein the one or more processors are further configured to:
based on the request, access a registration database to identify the listing of the BMCs, the registration database being distinct from the equipment tracking database; and
transmit, to the client device, a response indicating the listing of the BMCs, the listing including the BMC and at least one other BMC.

20. The apparatus of claim 19, wherein the request corresponds to a GET request that is in accordance with a representational state transfer (REST) protocol, and wherein the one or more processors are further configured to perform, based on the GET request, a GET operation targeting the IMS in accordance with the REST protocol to identify the listing using the registration database.

* * * * *